Nov. 1, 1932.   J. E. OSLUND   1,886,300
DIE MAKER'S TEMPLATE HOLDER
Filed Dec. 16, 1930
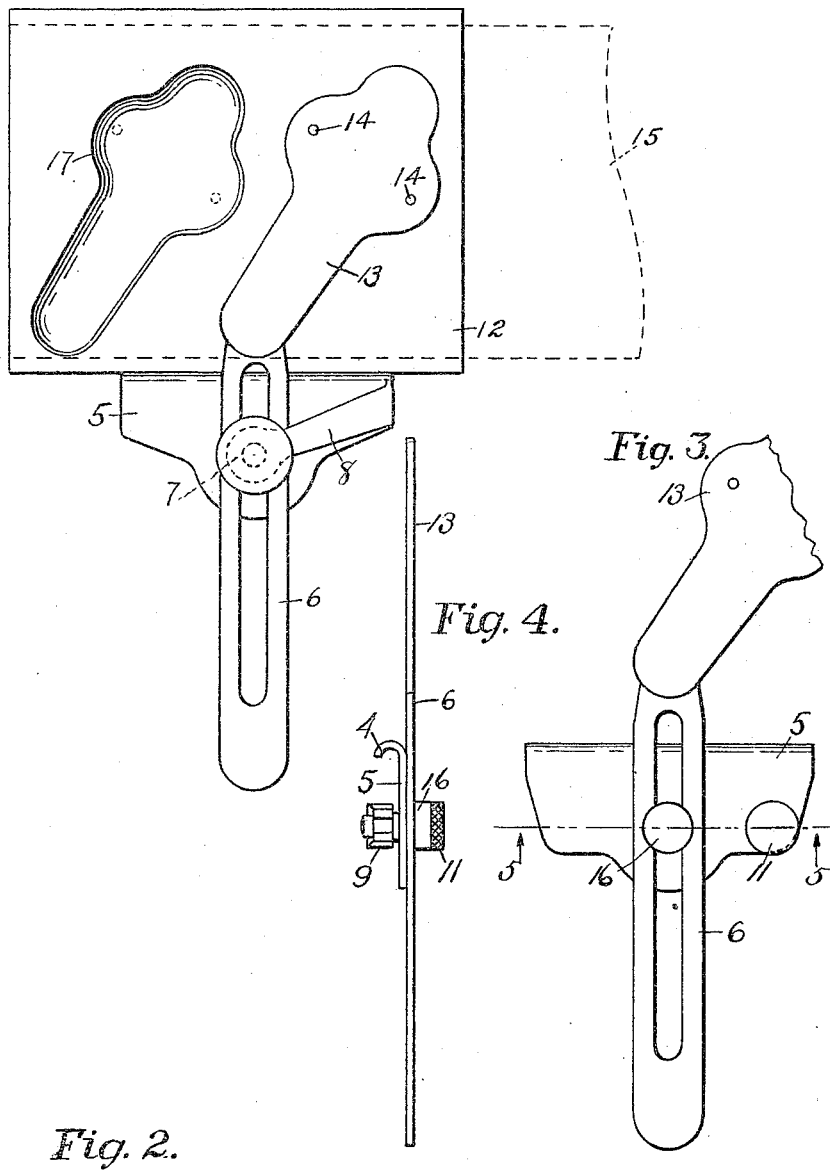
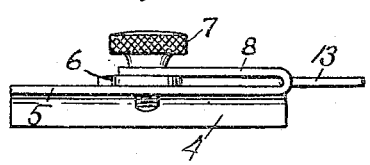
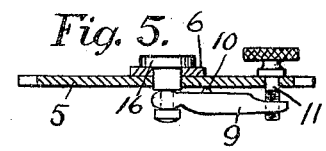

Patented Nov. 1, 1932

1,886,300

UNITED STATES PATENT OFFICE

JOHN E. OSLUND, OF HARTFORD, CONNECTICUT

DIE MAKER'S TEMPLATE HOLDER

Application filed December 16, 1930. Serial No. 502,758.

My invention relates to the class of tools employed by die makers in the planning or "laying out" of dies incident to the making of such dies, and an object of my invention, among others, is to provide an implement in the use of which, with little trouble, the proper locations for certain cuts on a die may be readily determined.

One form of my improved implement, in the construction and use of which the objects herein set out, as well as others, may be attained, is illustrated in the accompanying drawing, in which—

Figure 1 is a face view of a piece of metal to be formed into a die and illustrating the use of my improved implement in connection therewith.

Figure 2 is an end view of the tool, the edge of the template being shown in view beyond.

Figure 3 is a face view of a tool embodying a little different form of construction, with a portion of the template broken away.

Figure 4 is an edge view of the same.

Figure 5 is a view in section on a plane denoted by the dotted line 5—5 of Figure 3.

In the accompanying drawing the numeral 5 denotes the base of my improved template holder, said base having a lip at its front edge overturned to form a straight edge 4 for use as against the edge of a die 12. A template blade 6 is supported on the base, this blade having a lengthwise slot to receive a clamping member 7, in this instance in the form of a screw that extends through said slot and is threaded into the base. The clamping screw passes through a support 8 in the form of an arm overturned from one edge of the base and overlying the blade 6, as shown in Figures 1 and 2 of the drawing.

In the form of the device shown in Figures 3, 4, and 5 the base and the template blade are of the same general construction as just hereinabove described, as to similar parts in Figures 1 and 2. A clamping stud 16 extends through the slot in the blade and through a hole in the base 5, this stud being shouldered underneath the blade to receive the end of a clamping lever 9 having a fulcrum 10 resting against the under side of the base, as shown in Figure 5 of the drawing. A clamping screw 11 extends through the base near one end thereof and is engaged with one end of the lever 9. By means of this clamp screw the lever is rocked on its fulcrum to loosen or tighten the clamping stud 16.

In both forms of the device a template 13 is rigidly secured in any suitable manner, such as by soldering or welding to the end of the blade 6 or said template may be formed integral with the blade, in the illustration herein this template being in the shape of a hole to be formed in the die 12. The template has holes 14 through which the location of the pilot holes in the die 12 may be marked. In this operation the straight edge of the base 5 is placed against the edge of the die 12 in the position shown in Figure 1.

When the pilot holes have been located the holder is moved to the left and an outline 17 is formed in the shape of the template and for a hole of the same shape which is formed through the die.

The slot in the blade 6 and its pivotal support enables the template to be placed and clamped to the base in any desired position to accommodate such position to the locations on the die in which it is intended the outlines for cutting of the die shall be located in a manner to enable pieces to be cut from a strip of sheet metal 15 with a minimum amount of waste of metal, and as illustrated in Figure 1 of the drawing.

It will be understood that the holes 14 are formed in the die to receive punch pins from the plunger, which pins pass through the strip 15 and hold it securely in position for operation of the punch through the opening 17 in the lower die.

In accordance with the provisions of the patent statutes I have described the principles of operation of my invention, together with the device which I now consider to represent the best embodiment thereof; but I desire to have it understood that the device shown is only illustrative, and that the invention may be carried out by other means and applied to uses other than those above set out.

I claim:

1. A die maker's template and a holder therefor, said holder including a base, a blade slidably and pivotally attached to the base, means for clamping the blade, to the base, the template being secured to and projecting from the end of the blade in the plane of the blade.

2. A die maker's template and a holder therefor, said holder including a base, having a straight edge, a blade movably attached to the base, means for clamping the blade to the base, the template being secured to and projecting from the end of the blade in the plane of the blade.

3. A die maker's template and a holder therefor, said holder including a base, a blade attached to the base for lengthwise movement thereon, means for clamping the blade to the base, the template being secured to and projecting from the end of the blade in the plane of the blade.

4. A die maker's template and a holder therefor, said holder including a base having a straight edge, a blade having a lengthwise slot for pivotal and lengthwise movement on the blade, means for clamping the blade to the base, the template being secured to and projecting from the end of the blade in the plane of the blade.

5. A die maker's template and a holder therefor, said holder including a base, said base having a support projecting from one end thereof and bent back to overlie the body of the base, a blade having a lengthwise slot therein, a clamp screw projecting through said support and blade for clamping the latter in position, the template being secured to and projecting from the end of the blade.

6. A die maker's template and a holder therefor, said holder including a sheet metal base having a downturned lip forming a straight edge, a support comprising an arm backwardly bent from one edge of and so as to overlie the body of the base, a blade, a clamp screw projecting through said support and blade, and a template secured to the end of said blade.

JOHN E. OSLUND.